Sept. 14, 1926.

A. F. JONES 1,599,617

COUNTER MOLDING MACHINE

Filed April 12, 1924    10 Sheets-Sheet 1

Inventor.
A. F. Jones

Sept. 14, 1926.  A. F. JONES  1,599,617
COUNTER MOLDING MACHINE
Filed April 12, 1924   10 Sheets-Sheet 3

Sept. 14, 1926.

A. F. JONES

1,599,617

COUNTER MOLDING MACHINE

Filed April 12, 1924     10 Sheets-Sheet 5

Inventor.
A. F. Jones

Sept. 14, 1926.

A. F. JONES 1,599,617

COUNTER MOLDING MACHINE

Filed April 12, 1924   10 Sheets-Sheet 6

Inventor.

Sept. 14, 1926.

A. F. JONES 1,599,617

COUNTER MOLDING MACHINE

Filed April 12, 1924    10 Sheets-Sheet 7

Sept. 14, 1926.　　　　　　　　　　　　　　　1,599,617
A. F. JONES
COUNTER MOLDING MACHINE
Filed April 12, 1924　　　10 Sheets-Sheet 8

Inventor.
A. F. Jones
by Wright Brown Quinby May
Attys.

Sept. 14, 1926.  A. F. JONES  1,599,617
COUNTER MOLDING MACHINE
Filed April 12, 1924   10 Sheets-Sheet 10

Inventor,
A. F. Jones

Patented Sept. 14, 1926.

1,599,617

UNITED STATES PATENT OFFICE.

ALBERT F. JONES, OF SALEM, MASSACHUSETTS.

COUNTER-MOLDING MACHINE.

Application filed April 12, 1924. Serial No. 706,138.

This invention relates to automatic counter molding machines of the type shown by my Letters Patent No. 1,381,126 dated June 14, 1921, in which counter blanks supplied to the machine by an attendant are dealt with automatically by the machine and converted into molded and flanged counters.

The object of the invention is to provide improved conveying mechanism whereby the attendant is enabled to supply the machine with a considerable number of blanks arranged in a row or procession of separate bunches or groups, which are advanced successively to a point where the blanks of a group are taken up one by one and formed, the procession remaining at rest until a given group has been disposed of, and then moved forward to advance another group to position to have its blanks taken up.

Of the accompanying drawings forming a part of this specification,—

Figure 1 is an elevation showing one side of my improved machine.

Figures 1ª and 1ᵇ are fragmentary enlargements of portions of Figure 1.

Figure 3ª is a fragmentary view showing a portion of one of the conveyor chains.

Figures 8, 9 and 10 show portions of the mechanism for operating the conveyor chains, and the ram hereinafter described.

Figures 8ª and 8ᵇ are detail views hereinafter referred to.

Figure 11 is a plan view showing portions of the conveyor chains.

Figure 22, 22ª, 23, 24 and 25 are views illustrating the transferring table and the mechanism for opening and closing the movable blank gripping jaws carried by the table.

Figures 26 and 27 are elevations showing the forming dies.

Figures 1, 1A, 1B:
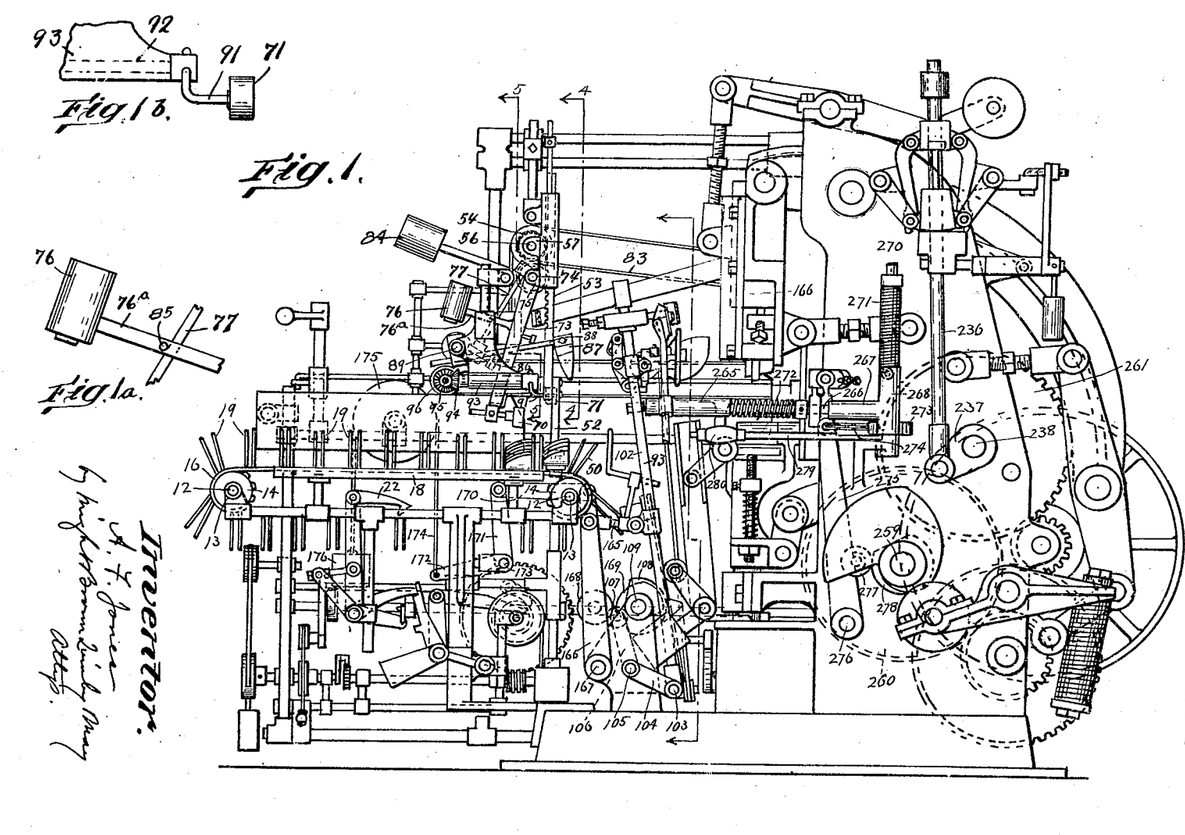
Figures 8, 8A, 8B:
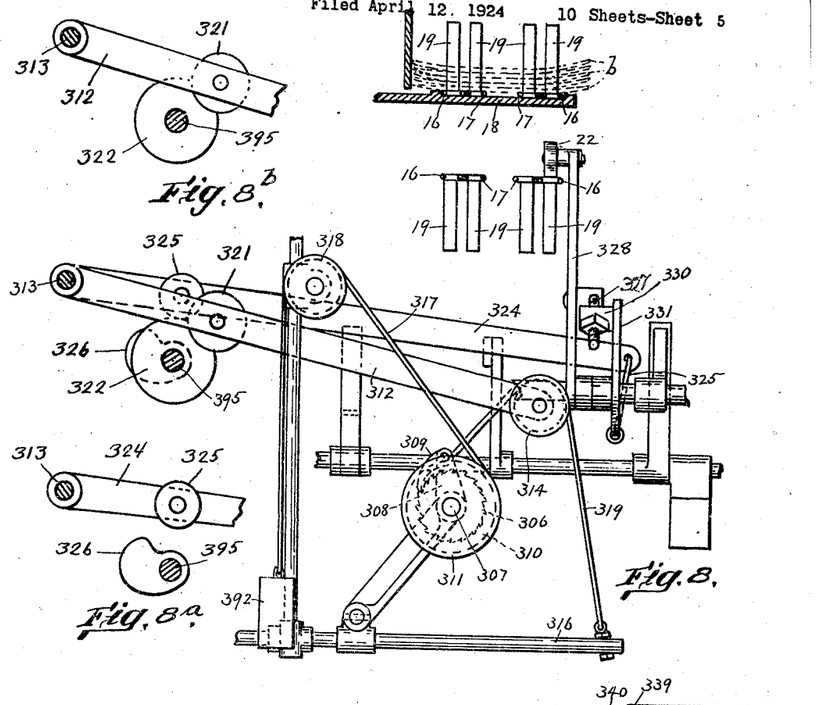
Figures 9, 10, 11:
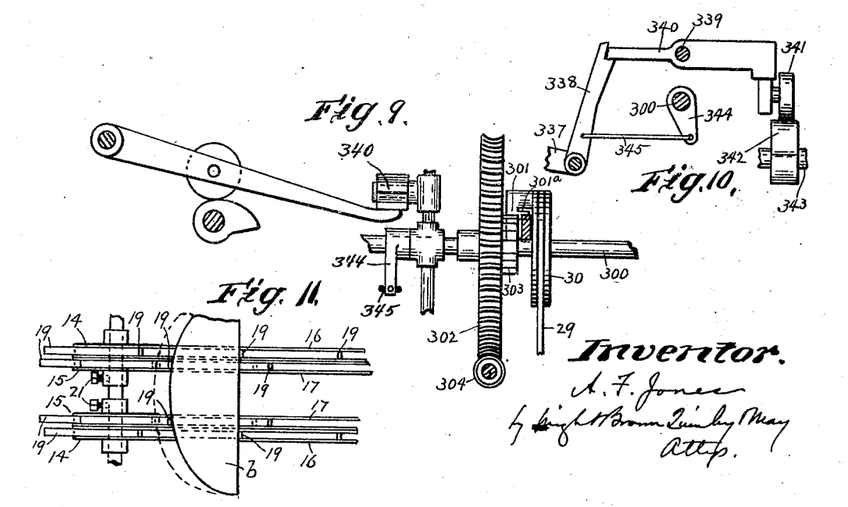

Fixed to loose shafts 12 (Figure 1) journalled in fixed bearings 13 on the frame of the machine are two outer sprocket wheels 14, and two inner sprocket wheels 15, (Figure 11). The outer wheels 14 carry two sprocket chains 16 and the inner wheels 15 carry two sprocket chains 17, the chains being shown conventionally excepting in Figure 3ª. The horizontal upper stretches of the chains slide on a fixed horizontal guide 18 (Figures 1 and 8). Each chain is provided with a series of spaced apart fingers 19 which are riveted to ears 20 (Figure 3ª) formed on some of the chain links and stand perpendicular to the guided stretches of the chain. Each outer chain 16 and the adjacent inner chain 17 constitute a pair of conveyor chains, there being two pairs. The clamshelled blanks $b$ to be molded are deposited by the operator in groups on the chains between the fingers, so that when the chains are moved forward, the fingers cause the blanks to move with the chains.

The object of employing two pairs of chains is to enable blanks of any desired width to be engaged at their forward edges by fingers on the outer chains 16 and at their rear edges by fingers on the inner chains 17, as shown by Figure 11, the spaces between the engaging fingers of the outer chains and those on the inner chains being variable by longitudinally adjusting the inner chains. This adjustment may be effected by loosening set screws 21 (Figure 11) securing the hubs of the inner sprocket wheels 15 to the loose shafts 12, partially rotating said wheels, thus longitudinally adjusting the inner chains with relation to the outer chains, and then tightening the set screws to maintain the adjustment. The spacing of the fingers 19 on each chain is greater than the maximum width of any blank, each blank bearing at its forward edge on two fingers on the outer chains and at its rear edge on two fingers on the inner chains.

A step-by-step movement is imparted to the conveyor chains by a reciprocating hook 22 (Figures 1 and 3) formed to engage the openings in links of one of the conveyor chains, said links being in the lower stretches of the chains. A movement of the hook in the direction of the arrow $a$ in Figure 3 causes it to move the chains sufficiently to locate a group of blanks between the blank ram and the blank lifter hereinafter described, the chains being connected to move in unison. The return movement of the hook causes it to engage another chain link, the hook being loosely pivoted at 23 to an oscillating lever hereinafter described. The hook is adapted to slide on the chain during the return movement, and to drop into a link at the end of said movement. The hook 22 is reciprocated by automatic mechanism which is operative only when the last blank of the foremost group has been transferred from the conveyor chains and will be described hereinafter, it being sufficient for the present to say that the blanks of the foremost group are lifted from the group one by one to be formed, and that when all the blanks of the group have been lifted the hook 22 moves the conveyor chains one step, so that another group is located in position to permit the successive lifting of the blanks thereof. The forward edges of the blanks of the forward group are evened or rendered flush with each other by an oscillatory evening finger 24 (Figure 3) adapted to abut against and even the forward edges of the blanks and then recede therefrom.

Figure 2:
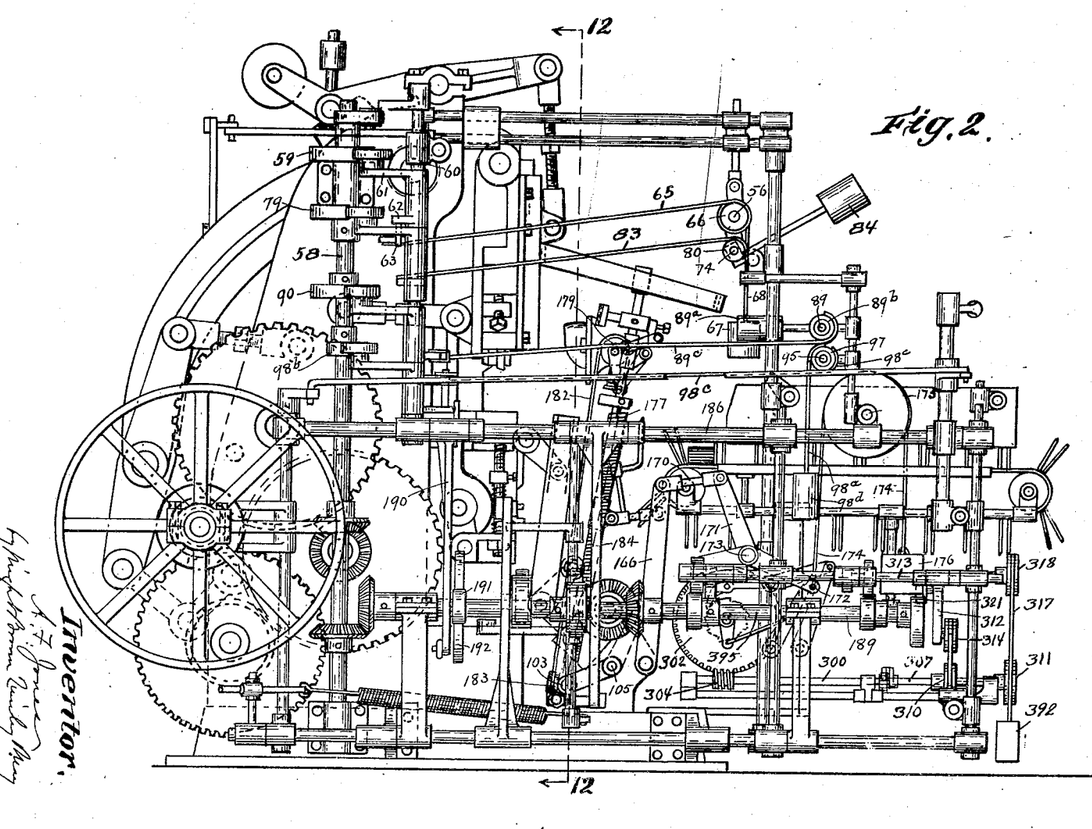
Figure 2 is an elevation showing the opposite side.
Figure 3:
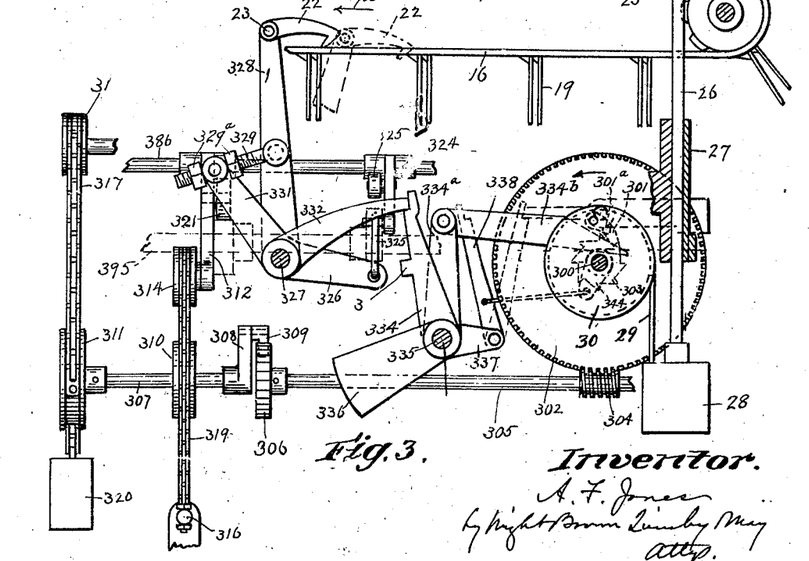
Figure 3 is an enlargement of portions of Figure 1.
Figures 3A, 26, 27:
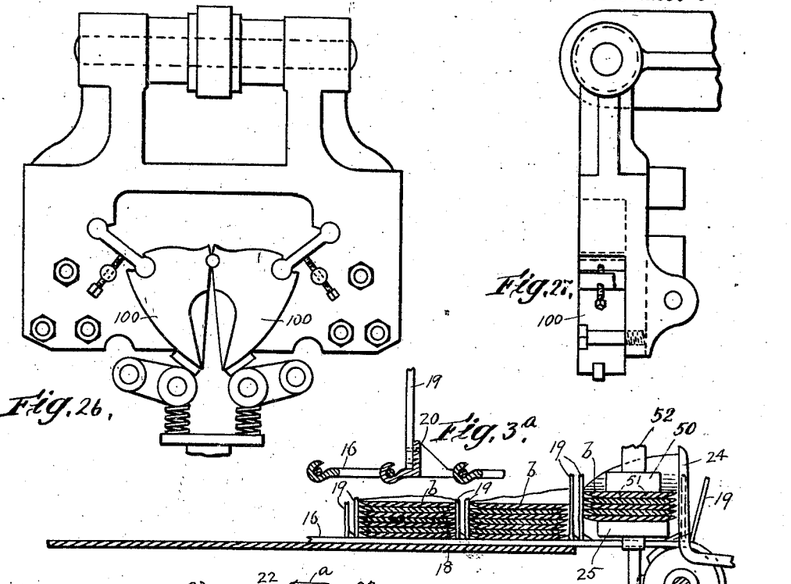
Figures 4, 6, 7:
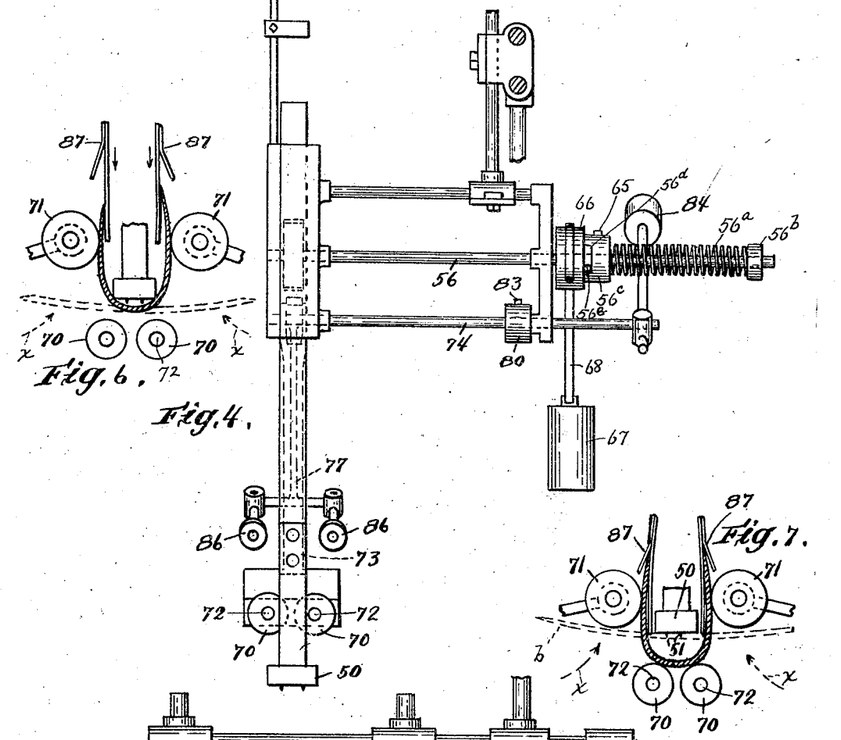
Figure 4 is a section on line 4—4 of Figure 1 looking toward the left.
Figures 6 and 7 are fragmentary views illustrating the operation of bending a counter blank.

The forward group of blanks $b$ is located over a vertically movable ram 25 (Figure 3) carried by a rod 26 which is slidable in a fixed guide 27. When the ram is in its lowest position, it is under the foremost group of blanks and is adapted to raise said group as indicated by Figure 3, mechanism being provided as hereinafter described for raising the ram at intervals. The rod 26 has a weight 28 at its lower end, and is connected through the weight with one end of a chain 29, the other end of which is attached to the periphery of a drum 30 constituting an element of the ram-operating mechanism described hereinafter. 50 (Figures 1 and 3) designates a reciprocating lifter which is movable in a vertical path in alignment with that of the ram 25 and is provided with spurs 51 adapted to impale the top blank of the foremost group when the lifter descends, and lift the blank when the lifter rises. The lifter is carried by a bar 52 (Figure 1) attached to a vertical rack bar 53. The rack teeth of said bar mesh with a pinion 54 on a rock shaft 56 which is journalled in fixed bearings 57. The rock shaft is rocked in its bearings to reciprocate the lifter through the rack and pinion by mechanism including a vertical power driven cam shaft 58 (Figures 2 and 12) having a cam 59, a bell crank lever fulcrumed on a fixed vertical rod 60, and having an arm 61 carrying a trundle roll bearing on the cam 59, and an arm 62 carrying a stud 63, a chain 65 connecting the stud 63 with a drum 66, on the rock shaft 56, and a weight 67 suspended from the drum 66 by a chain 68. The weight 67 tends to turn the rock shaft in the direction required to raise the lifter 50. The cam 59 acts through the described connections to turn the rock shaft 56 in the opposite direction and depress the lifter. To permit the lifter 50 to yield when moving downward, so that when engaging the top blank of a group having more than the intended number no injurious strain or breakage results, I provide a torsion spring $56^a$ fixed at one end to a collar $56^b$ fixed to the rock shaft 56, and at its other end to a loose collar $56^c$ (Figure 4). The loose collar has a slot $56^d$, the ends of which form spaced apart stops between which a pin $56^e$ fixed to the rock shaft is adapted to play. When the chain 65 is pulled to lower the lifter, the spring $56^a$ and collar $56^c$ enable the lifter to yield when in its downward movement it encounters an unusually high blank. When the lifter is fully raised a blank $b$ impaled thereon, as shown by dotted lines in Figure 6, is held horizontally considerably elevated above the conveyor chains. When the blank is thus elevated, two supporting rolls 70 are moved under the central portion of the blank, and two bending rolls 71 are moved in paths indicated by the dotted arrows $x$ $x$ Figure 6, against the blank, the movement of the rolls 71 being continued until a U-shape is imparted to the blank. The bending operation detaches the central portion of the blank from the lifter 50 and causes it to bulge as shown by Figure 7, the supporting rolls arresting the bulged portion. The supporting rolls are loosely mounted on studs 72 fixed to the free end of an oscillatory arm 73, shown by Figure 1, and by dotted lines in Figure 4. The arm 73 is adapted to oscillate loosely on a horzontal rock-shaft 74 journaled in fixed bearings 75 (Figure 1). The arm 74 is provided with a weight 76 which tends to force the supporting rolls forward under the blank. This action of the weight is permitted only when the blank is raised, and is prevented at other times by an oscillatory arm 77, which has another function described later, and is fixed to the rock shaft 74 and oscillated with the latter by mechanism including a cam 79 on the shaft 58, a drum 80 (Figures 2 and 4) fixed to the rock shaft 74, connections between the cam and the drum similar to those between the cam 59 and drum 66 including a chain 83 connected with the drum 80 and a weight 84 secured to the rock shaft 74 and tending to move the supporting rolls 70 under the raised blank. This movement is permitted at the proper intervals by the cam 79 and the described connections.

The arms 76ᵃ connecting the weight 76 with the arm 73 carrying the supporting rolls is provided with a stud 85 which bears on the arm 77 as indicated by Figure 1ᵃ when said arm is retracted, so that the arm 77 prevents the arm 73 and the supporting rolls 70 from swinging forward.

Another function of the arm 77 is to carry two presser feet 86 which are adapted to bear against the rear edge of the bent blank and force its forward edge firmly against the oscillatory transferring table hereinafter described. Said presser feet are secured to the swinging end of the arm 77 and are faced with yielding material, so that they do not indent the edge of the blank.

Figure 5:
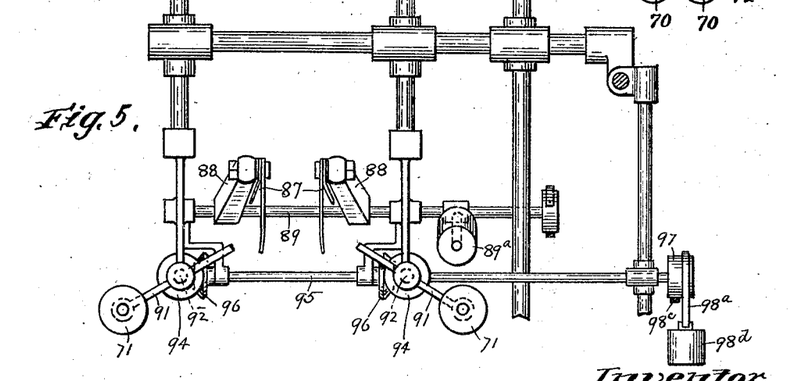
Figure 5 is a section on line 5—5 of Figure 1 looking toward the left.

The bender rolls 71 are loosely mounted on elbow-shaped arms 91 (Figures 1 and 1ᵇ) fixed to the forward ends of short rock shafts 92 journalled in fixed bearings 93 and provided at their opposite ends with bevel gears 94. A rock shaft 95 (Figure 5) journalled in fixed bearings is provided with bevel gears 96 meshing with the gears 94. The rock shaft 95 is rocked and caused to oscillate the bender rolls through the described connections by mechanism best shown in Figures 2 and 5, including a cam 98ᵇ (Figures 2 and 12) on the shaft 58, a drum 97 (Figure 5) fixed to the rock shaft 95, connections between the cam and the drum similar to those between the cam 59 and drum 66 and including a chain 98ᶜ (Figures 2 and 5) connected with the drum, and a weight 98ᵈ suspended by a chain 98ᵃ from the drum 97 (Figures 2 and 5).

When the blank is bent as shown by Figure 6, a pair of notched reciprocating eveners 87 descend upon its ends and move the blank downward upon the supporting rolls. In case the ends of the blank are not at the same height as shown by Figure 6, one of the eveners depresses the higher end and raises the lower end until the ends are at the same height as shown by Figure 7. The eveners are fixed to oscillatory arms 88 (Figure 5) which are secured to a rock shaft 89 (Figures 1, 2 and 5). The mechanism for rocking the rock shaft and thus depressing and raising the eveners, includes a cam 90 on the shaft 58, a weight 89ᵃ acting directly on the rock shaft 89 and tending to lower the eveners, and connections between the cam and the rock shaft similar to those between the cam 59 and the drum 66, said connections including a drum 89ᵈ (Figure 5) fixed to the rock shaft 89 and a chain 89ᵉ through which power is transmitted from the cam 90 to raise the eveners.

Figure 13:
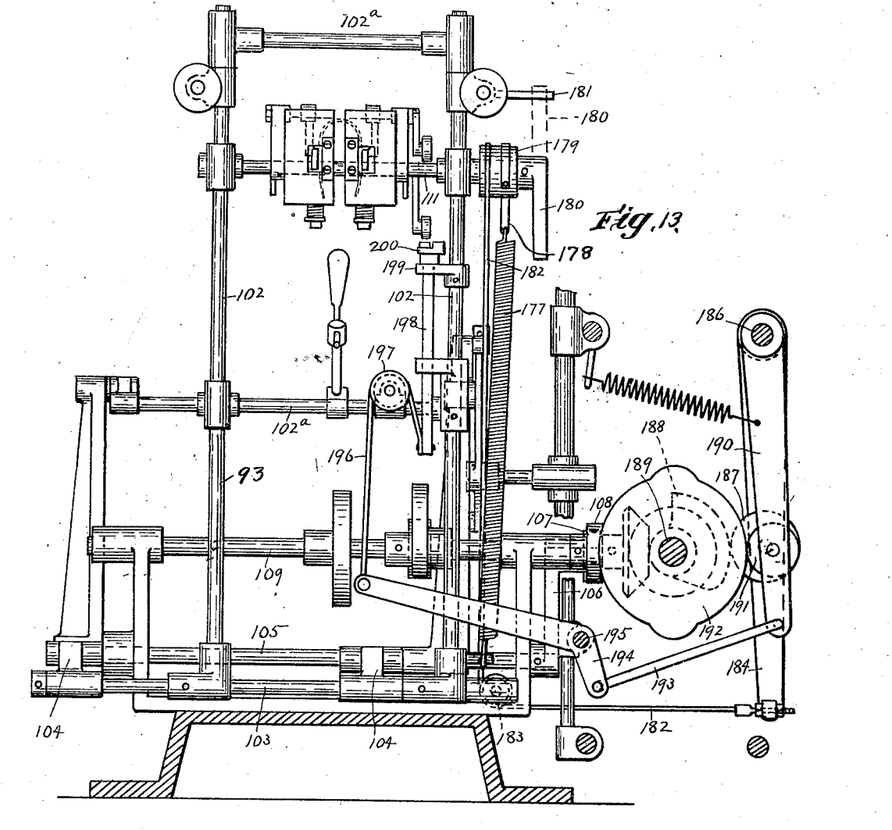
Figure 13 is a transverse vertical section looking toward the transferring table hereinafter described, and the table supporting frame.

A semi-rotatable transferring table is located in position to receive the bent blank and transfer the same to the forming instrumentalities which include the usual sectional female dies 100 and the vertically reciprocating male die 101. Said table is mounted on a movable frame best shown by Figure 13, and composed of longitudinal rods or bars 102 and transverse rods or bars 102ᵃ. For convenience, I will designate the frame by the numeral 102. The frame 102 has a compound movement, viz, a swinging movement toward and from the forming dies, and a vertical reciprocating movement. The lower end of the frame is connected by a rod 103 (Figures 1 and 13) constituting a vertically movable frame support with rocker arms 104 fixed to a transverse rock shaft 105, which is journalled in fixed bearings and is provided with a rocker arm 106 (Figure 1) having a trundle roll 107 which bears on a cam 108 fixed to a power driven shaft 109, the cam being continuously rotated. The cam 108 is timed to first positively swing the table carrying frame 102 to the right from the position shown by Figure 1, and then permit an endwise upward movement of the frame 102 and the table in unison with the male die 101, so that the table inserts the forward edge of the bent blank in the space between the dies while the male die is depressed, and then moves upward with the male die when the latter rises to press the blank. The transferring table is shown by Figure 1, and more in detail by Figures 22, 23 and 24. The table is preferably composed of two sections 110 (Figure 22), which are adjustable toward and from each other to conform the length of the table to the length of the counter blanks, means being provided for adjusting the sections toward and from each other and for positively securing them at different distances apart.

Figures 22, 23:
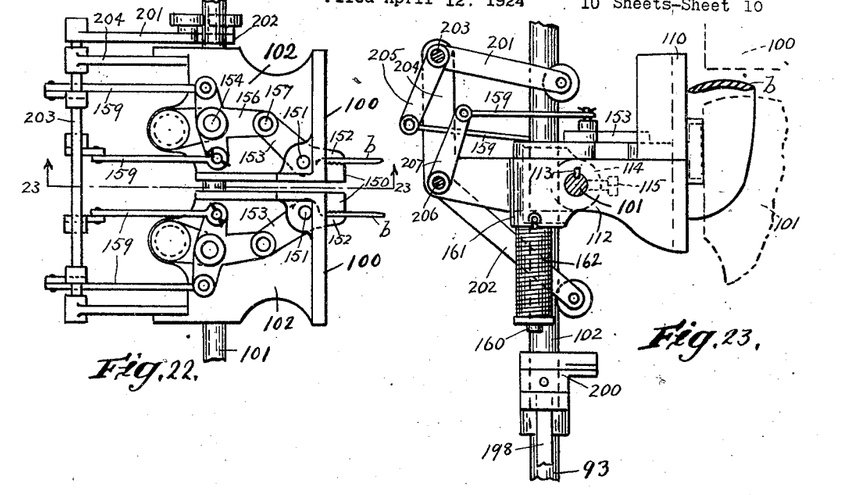
Figure 22A:
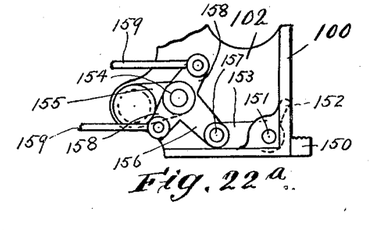
Figures 24, 25:
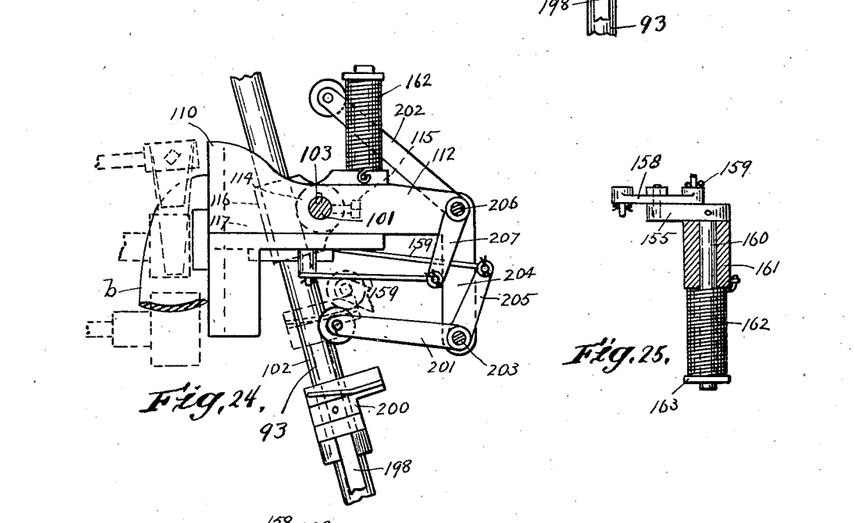
Figure 28:
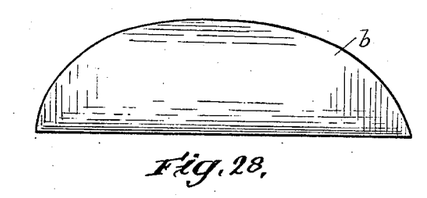
Figure 28 is a side view of a counter blank.

The table sections have arms 112 fixed to a transverse rod 111 (Figure 23), the rod passing through the arms, and being engaged therewith by a key 113 (Figure 23). Hubs 114 on the arms 112 of the table sections are slidable on the rod 111 and key 113, and are adjustably secured to the rod by set screws 115 (Figures 23 and 24). The rod 111 to which the transferring table is fixed as described, is adapted to turn with the table in bearings formed on sleeves 116 fixed to the oscillating frame 102 to permit the table to occupy the receiving position shown by Figure 24 and the delivering position shown by Figure 23, the swinging frame 102 being inclined when the table is in its receiving position and substantially vertical when the table is in its delivering position. The table is provided with two pairs of gripping jaws which are closed on the forward edges of a bent blank loosely confined by the supporting rolls 70, the bender rolls 71 and the eveners 87, and positively hold the blank until its body portion is inserted between and formed by the forming dies, the jaws grasping the portion of the blank from which the flange is formed, and releasing the blank before the formation of said flange by the reciprocating wiper hereinafter described. To the table sections are fixed inner gripping jaws 150 (Figures 22 and 22ª). Pivoted at 151 to the table sections are outer gripping jaws 152 provided with arms 153. Pivoted on studs 154 carried by spring-actuated arms 155, are three-armed levers including arms 156 pivoted at 157 to the jaw arms 153, and oppositely projecting arms 158 to which are pivoted rods 159. The arms 155 are fixed to studs 160 (Figure 25) journalled in bearings 161 formed on the table sections. With each stud 160 is associated a torsion spring 162 secured at one end to a head 163 fixed to the stud, and at its opposite end at 164 to the bearing 161. The arrangement is such that when the jaws are closed on a blank as shown by Figure 22, the springs 162 act to yieldingly hold the outer jaws yieldingly pressed against the blank, the pivots 157 being at one side of a straight line intersecting the centers of the pivots 151 and 154. When the jaws are open as shown by Figure 22ª, the springs act to hold the outer jaws swung outward, the pivots 157 being at the opposite side of said line.

I will now describe more fully the mechanism for operating the transferring table and its jaws. The table-carrying frame 102 is supported as above described by the vertically movable rod or support 103. When the table is in its receiving position (Figure 24) and when it is first moved to its delivering position (Figure 1), the rod or support 103 is at the lower end of its vertical movement as shown by Figure 1. When a bent blank has been pressed against the table, the latter being in its receiving position, and the blank gripped by the jaws, and the supporting and bending rolls and the eveners have been moved away from the operative positions shown by dotted lines in Figure 24, the frame 102 is swung to the right from the position shown by Figure 1 as follows: The frame is connected by links 165 (Figure 1) with levers 166 pivoted at 167 to the frame and provided with trundle rolls 168 which contact with cams 169 on the shaft 109. One of the levers 166 is connected by a link 170 with one arm 171 of a bell crank lever pivoted at 173 to a fixed support. The other arm 172 of the bell crank lever is connected with a chain 174 passing over a drum 175 and provided with a weight 176, which acts to force the levers 166 toward the right from the position shown by Figure 1 and hold the trundle roll 168 against the cam 169, so that the first part of a rotation of the cam permits the frame 102 to swing to the right from the position shown by Figures 1 and 24 to the position shown by Figure 23. When the blank now engaged with the table jaws clears the rolls and eveners, the table is semi-rotated. It should be here stated that the table is held in its receiving position by a spring 177 (Figures 2 and 13) connected at its lower end with the frame and at its upper end with a chain 178 fixed to a drum 179 on the shaft 113. The spring normally holds an arm 180 on the shaft 113 against a stop 181 on the frame, said arm and stop contacting with each other as indicated by dotted lines in Figure 13, when the table is in its receiving position. To the drum 179 is attached one end of a chain 182 passing under a pulley 183 (Figure 13) and extending to the free end of a lever 184, which is mounted to oscillate on a fixed rod 186 and has a trundle roll 187 held by the spring 177 against a cam 188 on the continuously rotating shaft 189. The cam 188 is timed to turn the table through the described connections during the latter part of the swinging movement of the frame 102 toward the forming dies, so that the table is turned and caused to insert one edge of the bent blank between the forming dies, while the male die 101 is depressed, as shown by Figure 23. When the male die rises to form the blank body, the arm 104 supporting the frame 102 swings upward so that the frame and table move upward with the male die both stopping at the same time. After the counter body has been formed, the table is returned to its receiving position by a reversal of the described operation. The movable jaws are opened and closed by the means next described.

A lever 190 (Figures 2 and 13) is mounted loosely on the rod 186 and has a trundle roll 191 bearing on a cam 192 on the shaft 189. A link 193 connects the free end of the lever 190 with one arm of a bell crank lever 194 pivoted at 195. The other arm of the lever 194 is connected by a chain 196 passing over a pulley 197, with a rod 198 which is slidable in guides 199 on one of the members 102 of the table carrying frame, the pulley being mounted on a cross bar 102ª constituting a member of the frame. The rod 198 has a head 200 which is caused by an endwise movement of the rod to act alternately on two levers 201 and 202 (Figures 22, 23 and 24). The lever 201 is fixed to a rock shaft 203 journalled in brackets 204 fixed to the table, and provided with arms 205. The lever 202 is fixed to a rock shaft 206 journalled in said brackets and provided with arms 207. The arms 205 and 207 are connected with the links 159 above described. When the table is in the receiving position, Figure 24, the head 200 has been raised to the dotted line position and then retracted to the full line position. This movement has caused the lever 201 to close the movable jaws 152 on a bent blank. The jaws remain closed until the table is in its delivering position, Figure 23, and the counter body has been formed. The head 200 then rises again and opens the movable jaws just before the table starts to return to its receiving position. The jaws remain open until another bent blank is in position to be grasped and are then closed by another upward movement of the head 200. When the blank gripped by the jaws is inserted between the forming dies 100 and 101, said dies are separated as indicated by Figure 23, the blank being held between the dies without touching the same. The dies are operated in the usual manner, the male die being reciprocated vertically and the female die oscillated to cause their cooperation with the male die. The mechanism shown by the drawings for operating the forming dies does not differ essentially from that disclosed in my Letters Patent No. 1,381,126, and therefore does not require extended description.

I have improved the mechanism for reciprocating the wiper 225 which forms the counter flange after the body of the counter has been molded, the improved mechanism being adapted to impart two wiping or flange forming strokes to the wiper while the latter is forming a flange, instead of a single stroke as heretofore, so that the flange is firmly set and is not liable to spring outward.

The wiper 225 is reciprocated in the usual vertical guides 226 by the improved mechanism next described.

Figures 18, 19, 20, 21:
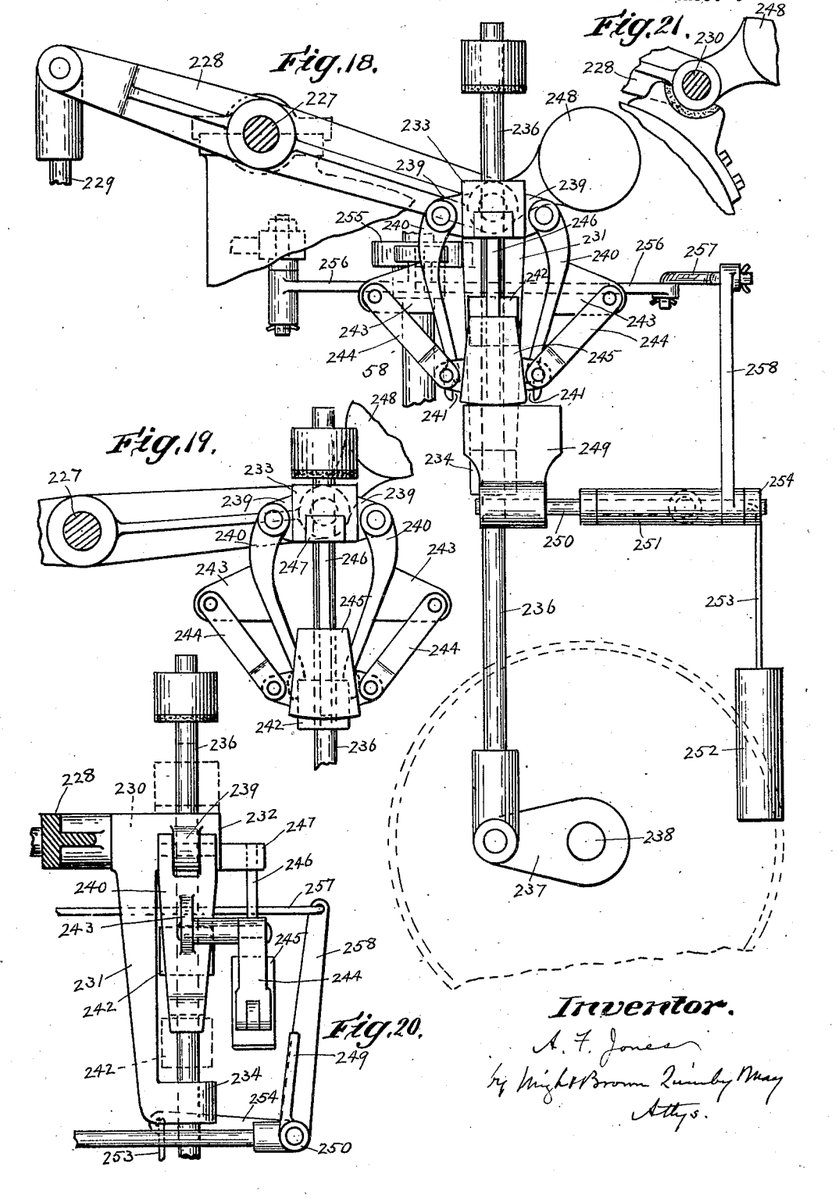
Figures 18 and 19 are enlargements of portions of Figure 1, showing the flange wiper operating mechanism.
Figure 20 shows the mechanism shown by Figure 18 looking from a different point.
Figure 21 is a fragmentary detail.
Figure 29:
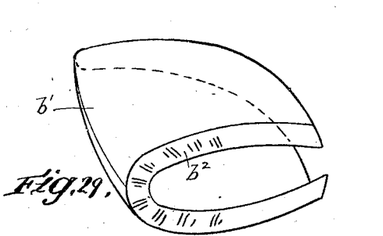
Figure 29 is a perspective view of a completed counter.

Pivoted at 227 to the frame of the machine is a lever 228, one arm of which is connected by a link or connecting rod 229 with the wiper. The other arm is provided with a stud 230 (see Figure 21 and dotted lines in Figure 20) having a turning fit in a socket or bearing in a frame 231 which is vertically reciprocated as presently described, and oscillates the lever through the connection formed by the said stud socket or bearing. The frame has upper and lower ears 232 and 234 having orifices in alignment with each other forming bearings or guides in which an elongated rod 236 (Figure 18) is free to slide endwise. One end of the rod is pivoted to a crank arm 237 which is fixed to a shaft 238 continuously driven by the power of the machine, and continuously reciprocates the rod 236. The upper ear 232 is provided with lateral ears 239 to which are pivoted clutch arms 240 extending downward at opposite sides of the rod 236 and provided with notches 241 (Figure 18) in their lower ends adapted to engage a fixed collar 242 on the rod 236 when the rod is in its lowest position shown by Figure 19. To move the clutch arms 240 into and out of engagement with the collar 242, I provide said arms with ears 243 which are connected by links 244 with a weight 245. The weight is slidable on a guide rod 246 fixed to a projection 247 on the upper frame ear 232. The tendency of the weight is to hold the clutch arms 240 in position to be engaged by the collar 242, as shown by Figure 19. When the clutch arms are thus engaged and the rod 236 commences its upward stroke, the rod acts through the collar 242 and the clutch arms to raise the frame 231 and swing the lever 228 in the direction required to move the wiper downward and perform the usual operation of wiping the counter flange by a single stroke. When the rod 236 moves downward, the lever 228 is moved to raise the wiper by a weight 248 on the rear arm of the lever. During this movement of the rod, the clutch arms 240 are disengaged from the collar 242, so that the frame 231 is unclutched or released from the rod by a stop lever 249 (Figures 18 and 20) which is moved into the path of the weight 245 by means presently described, and arrests the weight to prevent further downward movement thereof, as indicated by Figure 18, this arrest occurring before the end of the downward stroke of the rod 236. The continuation of the downward stroke causes the clutch arms to swing outward, so that they will not be engaged by the collar 242 during the next upward stroke of the rod. The stop lever 249 is fixed to a rock shaft 250 journalled in a fixed bearing 251 and turned to hold the stop arm alternately in and out of the path of the weight 245 by means including a weight 252 hung by a chain 253 from an arm 254 fixed to the rock shaft, to hold the stop arm in the path of the weight, and a cam 255 (Figure 18) on the shaft 58 acting through a cam lever 256, a link 257 and an arm 258 fixed to the rock shaft, to hold the stop arm out of the path of the weight. The male forming die 101 and the female forming dies 100 are operated by the usual mechanism, which includes a continuously rotated shaft 259, said mechanism being organized as usual so that one complete rotation of the shaft causes the dies to mold the body $b'$ (Figure 29) of a counter.

The main driving shaft $259^a$ of the machine is connected with the shafts 238 and 259 by the gearing shown by Figure 1, including a gear 260 in the shaft 259, and a gear 261 on the shaft 238.

The organization of said gearing is such that the shaft 238 rotates four times as fast as the shaft 259 so that the rod 236 causes the wiper, through the described connections, to make two wiping strokes, while a counter is confined by the forming dies.

The clutch mechanism operated as above described permits the wiper to remain at rest after a counter has been formed and flanged, until another blank has been positioned between and its body has been formed by the forming dies.

Figures 14, 15:
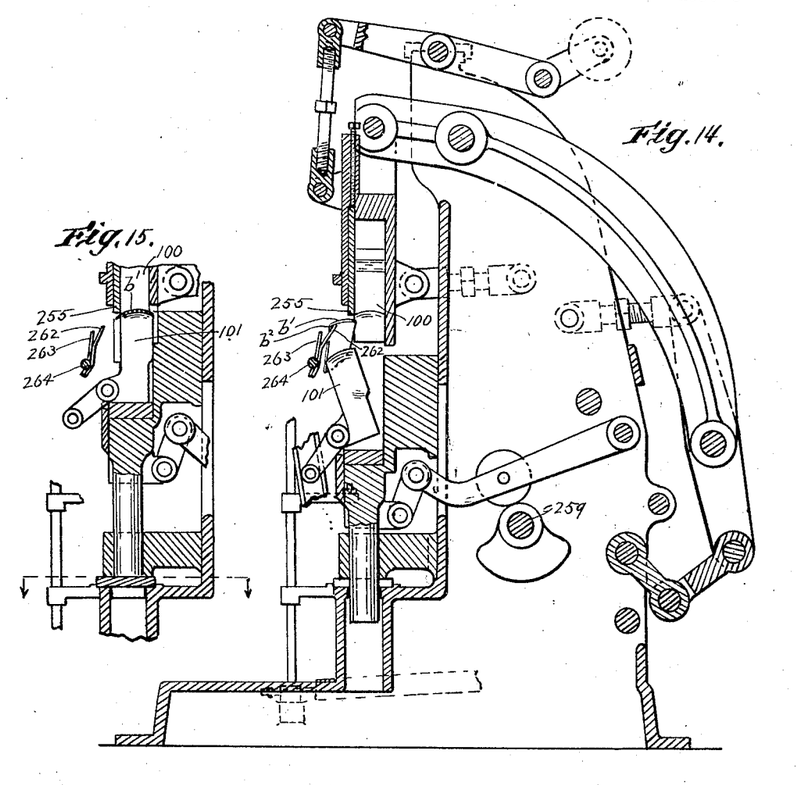
Figure 14 is a longitudinal vertical section showing the forming dies and the wiper.
Figure 15 is a view similar to portions of Figure 14, showing different positions of certain parts.

After the wiping operation, the completed counter is removed from the machine by a picker which engages the counter as indicated by Figure 14 and ejects it from one side of the machine.

Figures 16, 17:
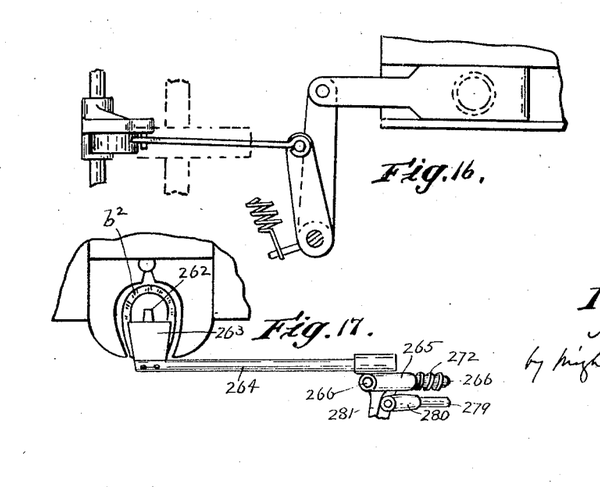
Figures 16 and 17 are fragmentary detail views.

The picker includes a prong 262 and a plate 263 fixed to a shaft 264 (Figure 12) which is fixed to a boss formed on a sleeve 265 loosely mounted on an arm 266 (Figures 1 and 12), one end of which is fixed in a tubular arm 267 on an upright sleeve 268, adapted to turn on a fixed stud 270. A torsion spring 271 is fixed at one end to a collar on the stud and at its other end to the sleeve 268. The tendency of the spring 271 is to swing the arm 266 and the picker inward. A spring 272 (Figure 1) fixed at one end to the arm 266 and at its other end to the sleeve 265 tends to turn the sleeve on the shaft in the direction required to swing the picker downward to the position shown by Figure 17. Fixed to the upright sleeve 268 is a sector 273 to which is fixed one end of a chain 274 (Figure 1). The other end of the chain is fixed to a lever 275 pivoted at 276 to the frame and having a trundle roll 277 which is held by the spring 271 against a cam 278 (Figure 1) on the shaft 259. Loosely mounted on a fixed rod 279 is a roll 280 arranged to bear on an arm 281 on the sleeve 265.

Figure 12:
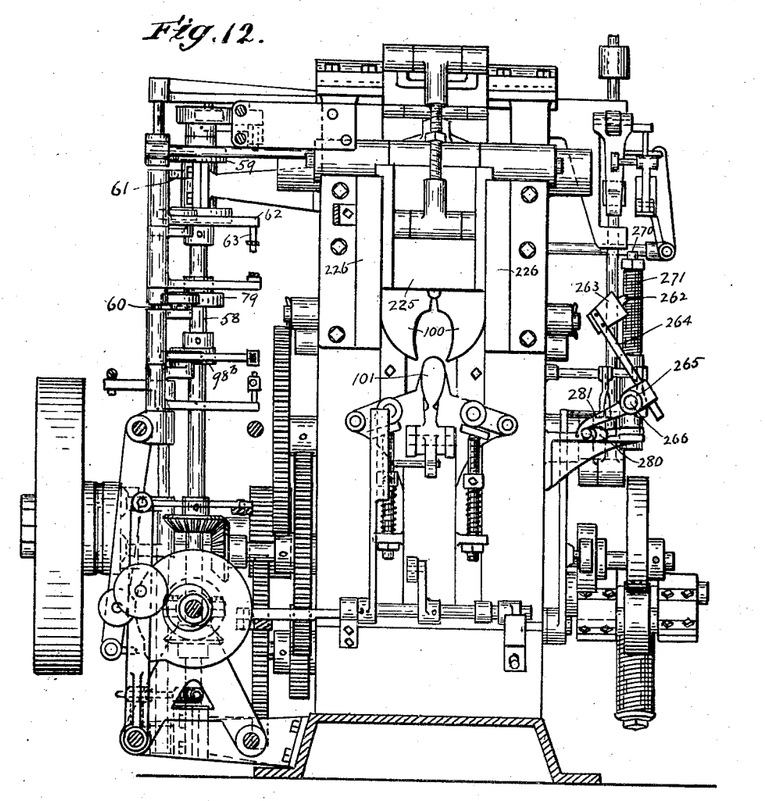
Figure 12 is a transverse vertical section looking toward the forming dies.

After the wiping operation the cam 278 permits the lever 275 to swing to the right from the position shown by Figure 1. The springs 271 and 272 then act conjointly to swing the picker to the position shown by Figure 17. The movement of the male die 101 to the position shown by Figure 14 and the subsequent depression of said die leaves the counter hanging on the picker. The cam 278 now swings the lever 275 to the left from the position shown by Figure 1, so that the described connections including the chain 274 cause the arm 266 to swing outward as indicated by Figure 12. The arm 281 in moving across the roll 280 as indicated by Figure 12, swings the picker outward and causes it to drop the counter off.

I will now describe in detail the mechanism for operating the ram 25 and the chain impelling hook 22, to cause the ram to press the top blank of a group against the lifter, and to cause the hook to impel the conveyor chains one step after a group of blanks is disposed of and the ram returns to its starting position.

The drum 30 is fixed to a rock shaft 300 journalled in fixed bearings. To the drum is pivoted a pawl 301. Loose on the rock shaft 300 is a worm gear 302, to which is fixed a ratchet 303. Engaged with the worm gear is a worm 304 on a short shaft 305 which is provided with a ratchet 306. 307 is a shaft journalled in fixed bearings in alignment with the shaft 305 and provided with an arm 308 (Figures 3 and 8) to which is pivoted a pawl 309 engaging the ratchet 306. To the shaft 307 are fixed two drums 310 and 311. 312 (Figure 8) is a lever adapted to oscillate vertically on a fixed rod 313, and carrying at its free end an idle roll or drum 314. A chain 315 fixed at one end to a stationary rod 316 passes over the drum 314 and is fixed at its opposite end to the drum 310 as shown by dotted lines in Figure 8. To the drum 311 is fixed one end of a chain 317 which passes over a loose drum 318 mounted on a fixed support and having a weight 320 at its opposite end. The lever 312 has a trundle roll 321 (Figure $8^a$) bearing on a cam 322 fixed to a power driven shaft 323. The lever is alternately raised and allowed to fall by the cam. Mounted to oscillate vertically on the rod 313 is a lever 324 (Figure $8^b$) having a trundle roll 325 located over a cam 326 fixed to the shaft 323. The free end of the lever 324 is connected by a link 325 with an arm 326 which is fixed to a rock shaft 327 journalled in fixed bearings. To the rock shaft 327 is secured an arm 328 which is oscillated by the rock shaft. The hook 22 above described, is pivoted at 23 to the arm 328. The connection between this arm and the rock shaft is preferably adjustable to permit the adjustment of the path of the hook lengthwise of the blank carrying chains, so that the hook when at the end of its forward movement may properly engage a chain link. To this end the arm 328 is loosely mounted on the rock shaft and is connected by a link 329 (Figure 3) with a stud 330 (Figure 8) on an arm 331 fixed to the rock shaft 327. The link is screw threaded and passes loosely through an orifice in the stud and is confined by nuts $329^a$ bearing on opposite sides of the stud. The rock shaft 327 is provided with an arm 332 adapted to be engaged by a detent arm 334 fixed to a rock shaft 335 journalled in fixed bearings, and provided with a weight 336 normally holding the detent arm 334 in the position shown by Figure 3, a notch in the free end of said arm engaging the arm 332. To the rock shaft 335 is fixed an arm 337 to which is pivoted a notched arm 338. Pivoted on a fixed support 339 (Figure 10) is a weighted lever 340, one arm of which has a trundle roll 341 held by the lever on a cam 342 on a driven shaft 343. The other arm of the lever is adapted to engage the notched end of the arm 338. To the rock shaft 300 is fixed an arm 344 (Figure 10) connected by a link 345 with the arm 338.

The operation of the mechanism thus far described is as follows:

Assuming that the lifter 50 is at the lower end of its movement and has engaged a blank, and that the hook 22 is in the full line position shown by Figure 3, the lifter now rises and lifts a blank. The cam 322 raises the lever 312 and causes the drum 314 to exert an upward pull on the chain 319 and rotate the shaft 307 in the direction required to cause the pawl 309 to partly rotate the ratchet 306, shaft 305, worm 304, and worm gear 302. The rotation of the worm gear is imparted through the pawl 301 and ratchet 303 to the drum 30 in the direction required to cause the drum to raise the ram 25 through the chain 29. The movement thus imparted to the ram is sufficient to raise another blank into position to be engaged by the lifter 50. When the cam 322 releases the lever 312, the latter drops and the pawl 309 is retracted.

When lifter 50 is depressed and engages a blank exposed beneath it and before the lifter rises with the engaged blank, the cam 322 raises the lever 312 causing the loose drum 314 to exert an upward pull on the chain 319 causing the chain to turn the drum 310 in the direction required to move the pawl 309 backward on the ratchet 306 and at the same time raise the weight 320, thus removing upward pressure from the ram which is held stationary while the lifter is lifting the engaged blank. The ram remains at rest until the lifter descends to its normal lower position. The cam 322 then allows the lever 312 to drop and slackens the chain 319. The weight 320 is now allowed to descend and turn the rock shaft 307 in the direction required to move the pawl 309 forward and act on the ratchet to turn the worm shaft 305 and worm gear 302 in the direction required to cause a tooth of the ratchet 303 to engage the pawl 301 and turn the drum in the direction required to raise the ram 25 sufficiently to press the exposed blank against the lifter 50. This operation continues until the last blank is removed, and causes the turning of the rock shaft 300 until the arm 344 acts through the link 345 to move the notched arm 338 from the position shown by full lines to that shown by dotted lines in Figure 3 and to the position shown by Figure 10, so that the notched arm is engaged with lever 340 while the latter is at rest. The lever is then moved by the cam 342 in the direction required to force the notched arm 338 downward. This movement of the notched arm turns the rock shaft 335 in the direction required to swing the arms 434$^a$ and another arm 334$^a$ fixed to the rock shaft to the right from the positions shown by Figure 3. The arm 434$^b$ moves a wedge bar 334$^b$ in the direction required to force its inclined face against a stud 301$^a$ (Figure 3) on the pawl 301 and lift the pawl from the ratchet, so that the ram is released and drops to its starting position ready to support another group of blanks. At the same time the arm 334 releases the arm 332 so that the rock shaft 327 and its arms are free to move in the direction required to cause the arm 328 and hook 22 to assume the forward position shown by dotted lines in Figure 3, the hook engaging a chain link. This forward movement of the hook is caused by the depression of the lever 324 permitted at this time by the cam 323, the lever acting through the link 325 on the arm 326. The free end of the arm 332 now rests on a stop 3 on the arm 334. The cam 326 next raises the lever 324, which acts through the link 325 to turn the rock shaft 327 in the direction required to move the hook 22 to the full line position Figure 3, and thus move the conveyor chains forward one step.

The operation of the machine may be briefly summarized as follows:

At the commencement the conveyor chains are held at rest with a group of blanks between the ram and the lifter. The lifter is raised to the position it occupies in holding a blank for the action of the bending and evening devices, and is arrested in this position by a fixed stop 50$^a$ (Figure 4), the supporting rolls 70, the bender rolls 71 and the eveners 87 being in their retracted positions. The supporting rolls are moved under the raised blank and then the bender rolls are moved to bend the blank and locate its ends in the path of the eveners, which next descend and even the ends of the bent blank. The presser feet 86 next move forward and press one edge of the blank against the face of the transferring table which is now in the receiving position shown by Figure 24. The movable gripping jaws of the table are then actuated so that the jaws grip the edge of the blank (Figure 22). The bender rolls, the supporting rolls, and the eveners are now retracted from the bent blank to permit onward movement of the latter. The swinging frame 102 then swings forward about half way to its extreme forward position and is held while the table is given a half rotation and is caused to face the forming dies. The forward movement of the frame 102 is then completed, causing the insertion of the body portion of the blank into the cavity between the dies, the male die being now lowered and the female dies retracted. The forming dies then act as usual to form the body of the counter. The gripping jaws are then opened, the frame 102 swings away from the forming dies, and the table is returned to its starting position.

I claim:

1. A counter molding machine comprising in combination, conveying chains adapted to hold a plurality of groups of blanks in predetermined positions, mechanism for moving the chains step by step, a blank lifter adapted to engage the top blank of one of the groups, mechanism for reciprocating the lifter, a ram adapted to force the top blank against the lifter, mechanism for intermittently raising the ram, and blank supporting and bending mechanism adapted to bend a lifted blank and detach it from the lifter.

2. A counter molding machine comprising in combination, conveying chains adapted to hold a plurality of groups of blanks in predetermined positions, mechanism for moving the chains step by step, a blank lifter adapted to engage the top blank of one of the groups, mechanism for reciprocating the lifter, a ram adapted to force the top blank against the lifter, mechanism for intermittently raising the ram, a pair of supporting rolls movable to position under a lifted blank, a pair of bending rolls adapted to bend the lifted blank and detach it from the lifter, and mechanism for projecting and retracting said rolls.

3. A counter molding machine comprising in combination, conveying chains adapted to hold a plurality of groups of blanks in predetermined positions, mechanism for moving the chains step by step, a blank lifter adapted to engage the top blank of one of the groups, mechanism for reciprocating the lifter, a ram adapted to force the top blank against the lifter, mechanism for intermittently raising the ram, a pair of supporting rolls movable to position under a lifted blank, a pair of bending rolls adapted to bend the lifted blank and detach it from the lifter, an evener adapted to even the ends of the bent blank, and mechanism for projecting and retracting said rolls and evener.

4. A counter molding machine comprising in combination, a blank lifter movable in a predetermined path, means for holding a group of blanks in the path of the lifter, means for reciprocating the lifter to cause it to engage and lift the top blank of the group, a ram movable in a path aligned with the path of the lifter, and ram-operating mechanism including means for moving the ram step by step to press the top blank against the lifter until all the blanks of the group have been lifted, and means for causing the return of the ram to a starting position after the lifting of the last blank of the group.

5. A counter molding machine as specified by claim 4, said lifter reciprocating means being organized to permit the lifter to yield when it contacts with the top blank and thereby prevent injurious strain on the lifter and the reciprocating means.

6. A counter molding machine comprising in combination, a blank lifter movable in a predetermined path, an endless conveyor adapted to move a plurality of groups of blanks and hold one group in the path of the lifter, means for reciprocating the lifter to cause it to engage and lift the top blank of the group, a ram movable in a path aligned with the path of the lifter, and ram and conveyor-operating mechanism including means for moving the ram step by step to press the top blank against the lifter until all the blanks of the group have been lifted, means for causing the return of the ram to a starting position after the lifting of the last blank of the group, and means for moving the conveyor, after the return movement of the ram, to interpose another group between the lifter and the ram.

7. In a counter molding machine, blank-conveying chains having blank-engaging fingers, means supporting and connecting said chains, a chain-actuating hook separably engageable with a link of one of the chains, and mechanism for reciprocating said hook to cause a step-by-step movement of the chains, said mechanism including means for longitudinally adjusting the hook to insure its proper registration with a chain link.

In testimony whereof I have affixed my signature.

ALBERT F. JONES.